(12) United States Patent
Steinkogler et al.

(10) Patent No.: US 9,141,838 B2
(45) Date of Patent: Sep. 22, 2015

(54) OPTOELECTRONIC SENSOR AND METHOD FOR THE DETECTION OF OBJECT INFORMATION

(71) Applicant: SICK AG, Waldkirch (DE)

(72) Inventors: Sascha Steinkogler, Waldkirch (DE); Roland Gehring, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 14/510,403

(22) Filed: Oct. 9, 2014

(65) Prior Publication Data

US 2015/0102110 A1 Apr. 16, 2015

(30) Foreign Application Priority Data

Oct. 10, 2013 (EP) ..................... 13188153

(51) Int. Cl.
*G06K 7/10* (2006.01)
*G01V 8/22* (2006.01)

(52) U.S. Cl.
CPC .............. *G06K 7/10811* (2013.01); *G01V 8/22* (2013.01); *G06K 7/10564* (2013.01)

(58) Field of Classification Search
CPC .. G06K 7/10811; G06K 7/10564; G01V 8/22
See application file for complete search history.

(56) References Cited

U.S. PATENT DOCUMENTS

| 5,438,187 | A | 8/1995 | Reddersen et al. | |
| 5,479,011 | A | 12/1995 | Rudeen et al. | |
| 6,024,283 | A | * 2/2000 | Campanelli et al. | 235/462.32 |
| 6,661,521 | B1 | 12/2003 | Stern | |
| 2004/0245337 | A1 | * 12/2004 | Krichever et al. | 235/454 |

FOREIGN PATENT DOCUMENTS

| DE | 102004051382 A1 | 4/2006 |
| EP | 0517956 A1 | 12/1992 |
| EP | 2620894 A1 | 7/2013 |

OTHER PUBLICATIONS

Search Report issued in European Application No. 13188153.4 dated Jan. 20, 2014.

* cited by examiner

*Primary Examiner* — Kristy A Haupt
(74) *Attorney, Agent, or Firm* — Nath, Goldberg & Meyer; Jerald L. Meyer; Rury L. Grisham

(57) ABSTRACT

An optoelectronic sensor (100) for the detection of object information from a monitored zone (108) is provided, wherein the sensor (100) comprises a light transmitter (12) having an associated transmission optics (14) for the beam formation of a transmitted light beam (102, 20, 24) and for a limitation of its beam cross-section to a predefined diameter in a depth of field range; a light receiver (116) for the generation of a received signal from the reflected light beam (112); and a control and evaluation unit (118) for extracting object information from the received signal. In this connection, the transmission optics (14) has at least two optical part regions (18*a-b*) having different beam-forming properties and the optical part region (18*a-b*) which acts in a beam-forming manner with respect to the transmitted light beam (20, 24) can be set in order to vary the depth of field range.

13 Claims, 2 Drawing Sheets

OPTOELECTRONIC SENSOR AND METHOD FOR THE DETECTION OF OBJECT INFORMATION

Figure 1:
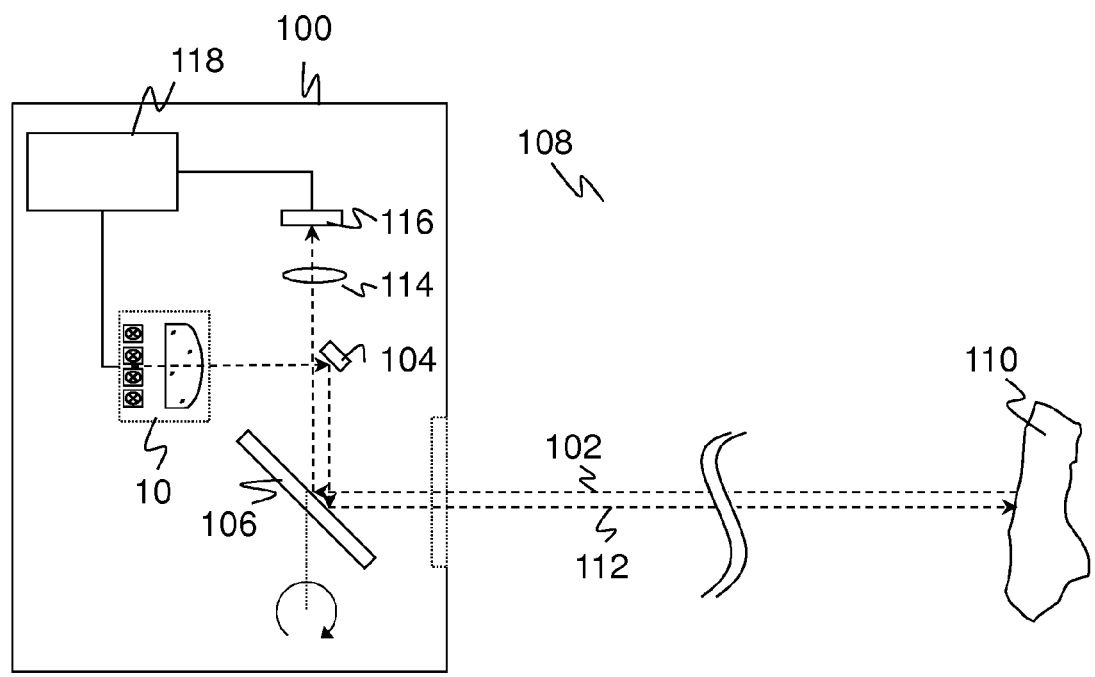

The invention relates to an optoelectronic sensor and to a method for the detection of object information from a monitored zone in accordance with the preamble of claim 1 and claim 15 respectively.

The most commonly used code readers are barcode scanners which scan a bar-code or a code of bars with a laser reading beam transverse to the code. They are frequently used at supermarket cash desks, for automatic package identification, sorting of mail items or for baggage handling in airports and in other logistic applications. In one important group of applications the objects carrying the code are conveyed past the code reader. Such that the objects can be arranged in arbitrary orientations at the conveyor, a plurality of code readers are frequently provided in order to record the objects from several sides or from all sides.

In the context of the further development of the digital camera technology, barcode scanners are indeed subjected to more competition with respect to camera-based code readers. However, barcode scanners on the basis of moved laser spots have the advantage that the reading region achieves a depth without a large optical demand in construction, the depth only being limited by the extent of the laser spot, this means by its diameter.

Particularly with respect to applications in the near region beneath a meter, an even larger depth of the reading range would be desirable, this means an expanded depth of field range. This depth of field is limited by the so-called caustic of the laser beam which describes the change of the spot diameter as a function of the reading distance. In order to namely resolve a barcode bar, the spot diameter is not allowed to exceed its width, at least to significantly exceed its width. For this reason the caustic finally predefines the depth of field range. A similar problem is presented with respect to non-code-reading laser scanners whose resolving power is likewise limited by the spot diameter and/or with respect to an asymmetric laser spot is limited by its extent within the scanning plane.

Common barcode scanners are configured for certain reading ranges which are essentially determined by a fixed transmission optics. In many applications the depth of field range of a fixed transmission optics is not sufficient, thus the theoretically achievable boundary of the depth of field has to be exceeded. For this purpose, common mechanical trackers of the focal position are provided which can, for example, be realized by a displacement of the collimation lens. The demand in construction is considerable due to the high accuracy of positioning for short response times and thus has a considerable effect on the manufacturing costs. Moreover, such trackers are susceptible to maintenance as they involve mechanical movable parts.

Multi-zone lenses are known at the receiver side for the expansion of the depth of field range. Such an optical sensor is disclosed by the EP 1 624 322 B1. Depending on the distance of a detected object, the light coming from the object enters through a different zone of the multi-zone lens. A use of the multi-zone lens at the transmission side is in this respect not provided and without further ado also does not satisfy this task. If the transmission light namely only exits through a zone then one has not obtained anything by means of the multi-zone lens in comparison to a simple lens. In contrast to this, if a plurality of zones is irradiated, then an even wider beam caustic results through the super-position thereof.

For this reason, it is the object of the invention to expand the depth of field range of an optoelectronic sensor based on a transmitted light beam.

This object is satisfied by an optoelectronic sensor and by a method for the detection of object information from a monitored zone in accordance with claim 1 or claim 12 respectively. A generic kind of sensor scans an object to be detected using a transmitted light beam whose beam cross-section is limited to a predefined diameter by means of a transmission optics within a depth of field range and then evaluates the received light signal. The invention then starts from the basic idea of providing at least two optical part regions with different beam forming properties in the transmission optics. The two optical part regions thus, for example, have different focal lengths or other optical properties which lead to a different caustic of the transmitted light beam. Following the introductory explanations, the caustic corresponds to the depth of field range. Thus, the depth of field range can be changed and/or displaced in that one ensures that a certain optical part region selectively acts in a beam-forming manner with respect to the transmitted light beam.

The invention has the advantage that a particularly cost-effective expansion of the depth of field range is enabled also beyond the theoretical boundary of a fixed laser beam caustic. One can omit mechanical focus trackers demanding in effort and expensive for the tracking of the transmission optics. Effectively, a focus adjustment function is in this way also made accessible for simple and cost-effective systems.

The light transmitter preferably has at least two light generation regions. These light generation regions can be individually selected, for example, by an individual electronic control. Through activation of a respective light generation region, light exits at a different position from the light transmitter, and in this way is incident at a different optical part region. The activation of one or more specific light generation regions is in this way a possibility of the non-mechanical setting of the optical part region acting in a beam-forming manner.

The light transmitter preferably has a plurality of light sources. This increases the optical output power and provides a possibility of selectively transmitting light through certain optical part regions in that individual light sources or groups of light sources are activated, deactivated or shaded. The plurality can be formed by individual light sources, such as, LEDs or edge emitters. Preferably a VCSEL array or an LED array is provided.

A variable aperture or a variable shading element is preferably associated with the light transmitter. An element having electronically changeable light translucency, such as an LCD, is particularly suitable as a shading element. The variable aperture or the variable shading element defines a settable region of the light transmitter where light is actually irradiated and is incident at a corresponding optical part region. In this way the light transmitter itself does not have to provide the possibility of activating individual light generation regions. Also a surface radiation source or an array of simultaneously active light sources is then plausible as light transmitters. The irradiation characteristics of the light transmitter can additionally be defined with a suitable optics, such as a lens, a micro-lens array or a diffractive optical element or by mirrored lens tubes.

The transmission optics preferably has a lens with pronounced imaging errors. In this way imaging errors are meant which do not remain, in an unavoidable manner, as artefacts of manufacture or as a result of a different optimization, but which are designed in a targeted manner. Different regions of this lens thus practically act as different lenses by means of the imaging errors, not only as a lens having small inaccuracies. The depth of field range of optical part regions vary significantly by means of the imaging errors. A suitable imaging error is the spherical aberration which effectively leads to different focal lengths in the center and at the outer region of the lens.

The transmission optics preferably has a multi-zone lens. This then goes beyond an imaging error of a lens manufactured with smooth contours, as jump-like transitions of the imaging properties exist from zone to zone. The zones are, for example, configured as concentric rings or as facets. One or more zones correspond to an optical part region. Instead of a reflective optics a reflexive transmission optics would also be plausible, this means an in particular facetted hollow mirror or a multi-zone mirror. Also a diffractive transmission optics (DOE, diffractive optical element) is in principle plausible. For this purpose nearly any arbitrary beam forming property per optical part region can be predefined and corresponding diffractive structures can be shaped.

The transmission optics preferably has a micro-optical field. Micro-lenses are primarily considered as micro-optics which can, however, at least partly be replaced with micro-mirrors, micro-prisms and the like. In order to form the optical part regions in a micro-optical field, the micro-optics differ from one another in a groupwise manner, for example, with respect to micro-lenses by different focal lengths. Principally, also a plurality of macro-optics lying next to one another is plausible rather than micro-optics, in particular macro-lenses and hollow mirrors. This however requires construction space and a corresponding extent of the light transmitter, in such a way that the various macro-optics can actually remain settable as acting optical part regions.

The transmission optics is preferably divided radially or circumferentially into optical part regions and the light transmitter is correspondingly divided radially or circumferentially into light generation regions. A radial division means a star-like segmentation into pie-like angular ranges. In contrast to this a circumferential segmentation leads to concentric rings. Both can be combined with one another. Preferably, the division of transmission optics and light transmitter is correspondingly true such that a like optical part region having suitable dimensions faces each light generation region at a suitable spacing and in a suitable orientation, such that light from each light generation region is precisely beam-formed by the associated optical part region.

Light transmitter and transmission optics are preferably arranged radially movable with respect to one another or rotatable against one another. A radial displacement is particularly suitable for circumferential segmentation, as a respectively changed association between rings of light transmitters and transmission optics can thereby be achieved. Correspondingly, a rotation is particularly suitable with respect to radial segmentation which rotates the respective angular ranges into a different association.

The control and evaluation unit is preferably configured to vary the setting of the optical part regions sequentially, in particular periodically. Thereby a plurality of detection attempts or reading attempts can be tried out for different beam caustics and in this way for a changed depth of field range. Alternatively a reading region for a certain or expected object spacing can be fixedly predefined and the matching optical part region can be set once. As a further alternative, the current object spacing is measured and the depth of field range is dynamically tracked in analogy to known auto focus systems by setting a matching optical part region.

The sensor is preferably configured as a laser scanner, in particular as a bar code scanner having a deflection unit with the aid of which the transmitted light beam scans the monitored zone. The deflection unit moves the light beam to be scanned over the object and/or the barcode. Through the adapted depth of field range an increased object resolution is achieved specifically also in the near field and the reading of barcodes with small structures becomes possible.

The method in accordance with the invention can be further developed in a similar manner and in this respect shows similar advantages. Such advantageous features are described by way of example, but not conclusively in the dependent claims adjoining the independent claims.

Figure 2:
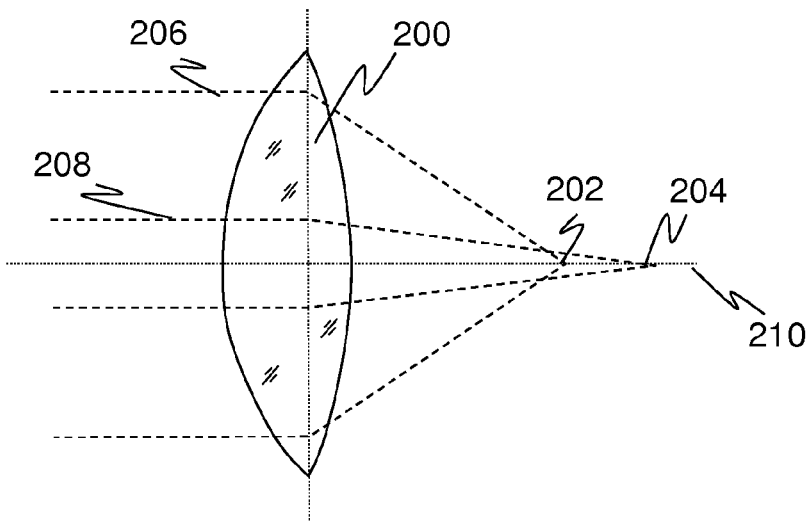
Figure 3:
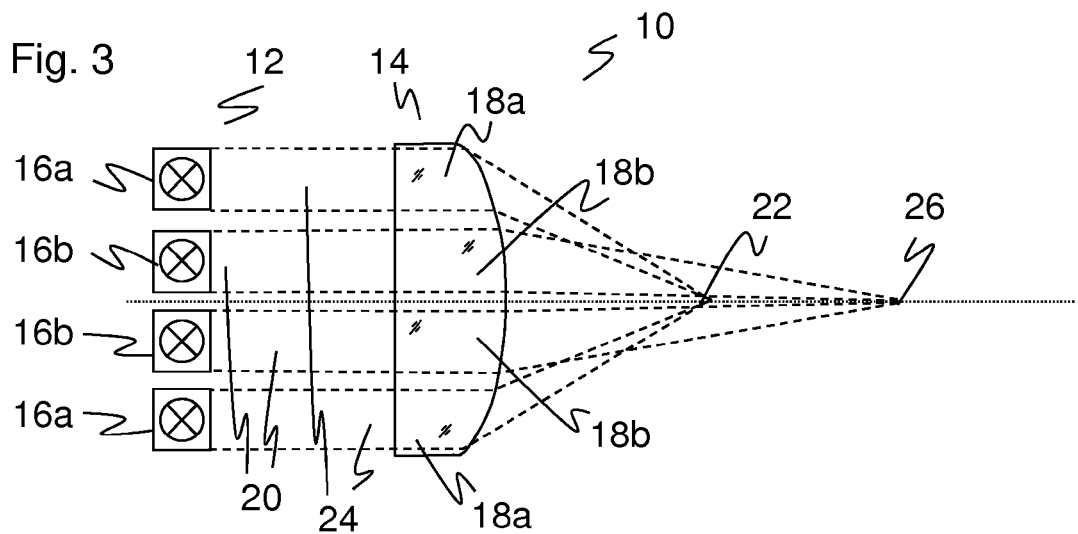
Figure 4A:
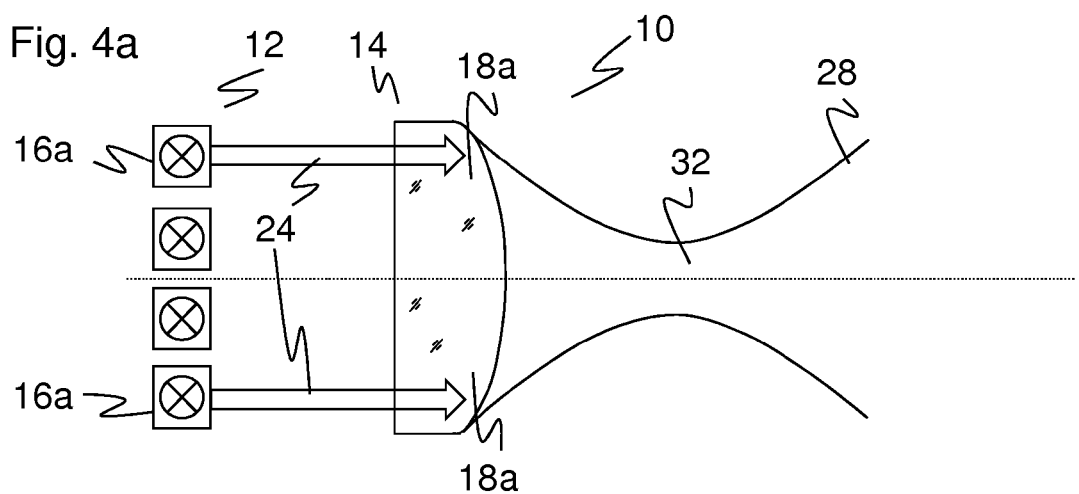
Figure 4B:
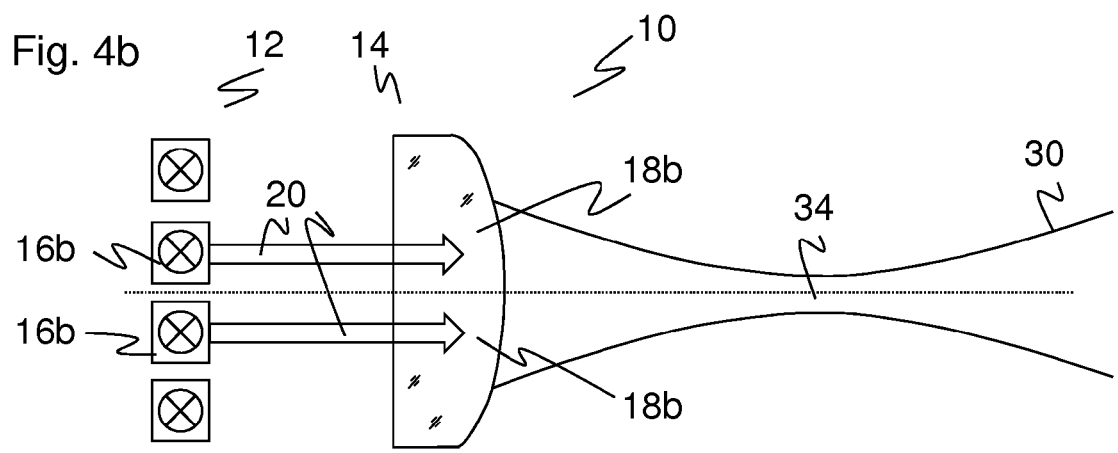

The invention will be described in detail in the following also with respect to further features and advantages by way of example by means of embodiments and with reference to the submitted drawing. The illustrations of the drawings show in:

FIG. 1 a schematic sectional illustration of a laser scanner;

FIG. 2 an illustration of a lens having spherical aberration and its beam guidance;

FIG. 3 an illumination apparatus having settable optical part regions;

FIG. 4a the beam caustic on setting the outer part optical region of the illumination apparatus in accordance with FIG. 3; and FIG. 4b the beam caustic on setting the inner optical part region of the illumination apparatus in accordance with FIG. 3.

FIG. 1 shows a laser scanner 100 as an embodiment of an optoelectronic sensor. The laser scanner 100 can, for example, be configured as a distance measuring sensor in order to record surface reliefs or contour images of a scene or as a code reader. Other optoelectronic sensors having a transmission light beam, for example, light sensors are likewise plausible.

In an illumination apparatus 10 explained in more detail in the following, a light transmitter generates a transmission light beam 102 with a changeable beam caustic via a transmission optics. The transmission light beam 102 is directed to a rotary mirror 106 and from there into a detection region 108 with the aid of a deflection mirror 104. Following reflection or remission at an object 110, the light returns to a light reception element 116 as a received light beam 112 via the rotary mirror 106 and a reception optics 114. There the received light is transformed into an electric signal and is further processed in an evaluation unit 118. For this purpose the spacing of the object 110 is calculated, for example, with reference to the light propagation time of the transmission light beam 102 and the received light beam 112 or the scanning information is read out as a code, in particular as a bar code.

FIG. 2 shows a lens 200 with its beam guidance for the explanation of the imaging error of the spherical aberration which can advantageously be used in the illumination apparatus 10. The spherical aberration is represented in different focal positions 202, 204 of beams 206, 208 which are incident at the lens 200 at a different spacing with respect to the optical axis 210.

In a sectional illustration FIG. 3 shows an embodiment of the illumination apparatus 10 having a light transmitter 12 and a transmission optics 14. The light transmitter 12 is extended in an aerial manner and for this purpose has a plurality of light sources 16a-b, for example in that a VCSEL array or an LED array is used. A lens having a pronounced spherical aberration in this embodiment serves as a transmission optics 14. This pronounced imaging error effectively leads to different optical part regions 18a-b with different beam forming properties. Thereby internal light beams 20 are focused at a close point 22 and outer light beams 24 are focused at a far point 26.

The individual light sources 16a-b or groups thereof can be electrically controlled independent of one another by an electrical control and in this way the light transmitter 14 can be activated in different spatial zones. Thus, different optical part regions 18a-b of the transmission optics 14 can be illuminated which have different focal positions of the respectively exiting light beams 20, 24 due to the spherical aberration. Thereby a changed beam-forming behavior of the transmission optics 14 and in its consequence a variable beam caustic with correspondingly changeable depth of field ranges is achieved. For example, different focal positions corresponding to the points 22, 26 are covered in this embodiment by the preferably radially symmetrical groups of light sources 16a-b through a sequential control thereof. The depth of field range is thereby totally expanded.

FIG. 4 further illustrates this effect. In this connection FIG. 4a shows a state in which the outer light source 16a is active and FIG. 4b correspondingly shows a state with an activated inner light source 16b. The radial division into two parts is purely exemplary, likewise additional radial or otherwise formed divisions can be provided with respect to the light transmitter 12 as well as with respect to the transmission optics 14. The outer light beams 24 of the outer light sources 16a are focused at the close point 22, as already explained with respect to FIG. 3, the light beams 20 lying closer to the axis of the inner light sources 16b are focused at the far point 24 in contrast thereto. Thus, different beam caustics 28, 30 arise.

A switching of the light source 16a-b for this reason effects that different optical part regions 18a-b act with respect to the transmission light and thus also switch the beam caustic 28, 30. Typically, a kind of constriction having a range 32, 34 of particularly small beam extent is formed in the beam caustics 28, 30 in whose environment the respective depth of field range lies. As can directly be seen from a comparison of FIG. 4a and FIG. 4b this range 32, 34 is displaced by the switching. Thereby, the depth of field range can totally be expanded at least sequentially. This is utilized, for example by a periodic switching or by a targeted switching to a range 32, 34 matching the received or measured object spacing.

The transmission optics 14 in the form of a lens with a pronounced spherical aberration is only an embodiment. Numerous alternatives of transmission optics with optical part regions 18a-b which have beam forming properties different from one another and which respectively lead to different depth of field ranges exist. For example, a facetted or multi-zone optics on the basis of spherical, aspheric or even cylinder lenses can be used. Also Fresnel lenses having zones of different focal positions are suitable for this purpose. Likewise the use of diffractive or reflective optics rather than refractive optics are plausible, also the use of DOEs or of hollow mirrors is plausible. A further example having a particular number of degrees of freedom with respect to the design of optical part regions 18a-b are micro-optical arrays or also macro-optical arrays, in particular having lenses of different focal lengths.

Also alternative embodiments of the light transmitter 12 are plausible. The possibility of being able to control different regions of a light transmitter 12 extended in an aerial manner electrically independently from one another is advantageous. This is achieved with VCSEL arrays, but also with LED arrays, or with separately controllable edge emitters, wherein the respective light sources 16 preferably emit already pre-collimated light. Plausible are also homogeneously illuminated light sources without switchable regions, therefore having in particular electrical adjustable apertures or shaders.

The embodiments of the FIGS. 3 and 4 use a radially symmetric division, this means substantially concentric ring regions which arise by means of the pronounced spherical aberration. Alternatively, also embodiments having a circumferential division are possible, this means the groups of light sources 16a-b and the optical part regions 18a-b form star-like angular ranges or "pie-pieces". The different focal positions and in this way depth of field ranges are then achieved by means of selective illumination of certain segments with different reflective power. Imaging errors are not necessarily used for this purpose.

Light transmitters 12 and transmission optics 14 are moved relative to one another in a further embodiment, such that the association between the groups of light sources 16a-b and optical part regions 18a-b are changed. Depending on the division this is achieved by radial displacement, this means by a lateral shift transverse with respect to the optical axis or by a rotation. As it is the case for all changes of the depth of field range this change takes place once and then remains static for a certain duration of operation, or the depth field range is dynamically changed in a tracking.

The invention claimed is:

1. An optoelectronic sensor (100) for the detection of object information from a monitored zone (108), comprising:
   a light transmitter (12) having an associated transmission optics (14) for the beam formation of a transmitted light beam (102, 20, 24) and for limiting its beam cross-section to a predefined diameter in a depth of field range,
   a light receiver (116) for the generation of a received signal from the reflected light beam (112); and
   a control and evaluation unit (118) for the extraction of object information from the received signal,
   characterized in that the transmission optics (14) has at least two optical part regions (18a-b) having different beam forming properties and in that the optical part region (18a-b), which acts in a beam forming manner with respect to the transmitted light beam (20, 24), can be set in order to change the depth of field range,
   wherein the light transmitter (12) has at least two light generation regions (16a-b), the transmission optics (14) are divided radially or circumferentially into optical part regions (18a-b), and the light transmitter (12) is correspondingly divided radially or circumferentially into the light generation regions (16a-b).

2. A sensor (100) in accordance with claim 1, wherein the light transmitter (12) has a plurality of light sources (16a-b).

3. A sensor (100) in accordance with claim 2, wherein the light transmitter (12) comprises a VCSEL array or an LED array.

4. A sensor (100) in accordance with claim 1, wherein a variable aperture or a variable shading element is associated with the light transmitter (12).

5. A sensor (100) in accordance with claim 1, wherein the transmission optics (14) have a lens having pronounced imaging errors, in particular a pronounced spherical aberration.

6. A sensor (100) in accordance with claim 1, wherein the transmission optics (14) have a multi-zone lens.

7. A sensor (100) in accordance with claim 1, wherein the transmission optics (14) have a micro-optical field.

8. A sensor (100) in accordance with claim 1,
wherein the light transmitter (12) and the transmission optics (14) are arranged radially movable with respect to one another or can be rotated against one another.

9. A sensor (100) in accordance with claim 1,
wherein the control and evaluation unit (118) is configured to sequentially vary the setting of the optical part regions (18*a-b*).

10. A sensor (100) in accordance with claim 9,
wherein the control and evaluation unit (118) is configured to periodically vary the setting of the part optical regions (18*a-b*).

11. A sensor (100) in accordance with claim 1,
which is configured as a laser scanner having a deflection unit (106) with the aid of which the transmitted light beam (102, 20, 24) scans the monitored zone (108).

12. A sensor (100) in accordance with claim 11,
which is configured as a barcode scanner.

13. A method for the detection of object information from a monitored zone (108) in which a light beam (102, 20, 24) transmitted into the monitored zone (108) is beam-formed by a transmission optics (14) in order to limit its beam cross-section to a predefined diameter in a depth of field range,
a received signal is generated from the light beam (112) reflected from the monitored zone (108) and object information is extracted therefrom,
characterized in that the arrangement between the light transmitter (12) and the transmission optics (14) can be changed or only one of at least two light generation regions (16*a-b*) of the light transmitter (12) is activated, such that the transmitted light beam (20, 24) is beam-formed only by an optical part region (18*a-b*) of at least two optical part regions (18*a-b*) of the transmission optics (14) and a depth of field range associated with
wherein the transmission optics (14) are divided radially or circumferentially into optical part region (18*a-b*), and the light transmitter (12) is correspondingly divided radially or circumferentially into light generation regions (16 *a-b*).

* * * * *

UNITED STATES PATENT AND TRADEMARK OFFICE
CERTIFICATE OF CORRECTION

Page 1 of 1

PATENT NO. : 9,141,838 B2
APPLICATION NO. : 14/510403
DATED : September 22, 2015
INVENTOR(S) : Sascha Steinkogler et al.

It is certified that error appears in the above-identified patent and that said Letters Patent is hereby corrected as shown below:

In the claims,

Claim 13, Column 8, Line 14: after "associated with" please insert --the optical part region (18a-b) is thereby set,--

Signed and Sealed this
Ninth Day of February, 2016

Michelle K. Lee
*Director of the United States Patent and Trademark Office*